(12) United States Patent
Feller

(10) Patent No.: US 6,463,807 B1
(45) Date of Patent: *Oct. 15, 2002

(54) MAGNETIC FLOW SENSOR AND METHOD

(76) Inventor: Murray F. Feller, 21577 NW. 75th Avenue Rd., Micanopy, FL (US) 32667

( * ) Notice: Subject to any disclaimer, the term of this patent is extended or adjusted under 35 U.S.C. 154(b) by 0 days.

This patent is subject to a terminal disclaimer.

(21) Appl. No.: 09/704,913

(22) Filed: Nov. 2, 2000

(51) Int. Cl.[7] ............................................... G01L 11/02

(52) U.S. Cl. ................................................... 73/861.12

(58) Field of Search .............................. 73/151, 861.17, 73/861.16, 155, 861.12

(56) References Cited

U.S. PATENT DOCUMENTS 5,297,425 A * 3/1994 Hamby et al. ................. 73/155
6,085,599 A * 7/2000 Feller ....................... 73/861.13

* cited by examiner

*Primary Examiner*—Benjamin R. Fuller
*Assistant Examiner*—Jewel V. Thompson
(74) *Attorney, Agent, or Firm*—David Kiewit

(57) ABSTRACT

A magnetic flow sensor using a permanent magnet to provide the magnetic flux is configured to compensate for electrode related drifts. The electrode signals are cyclically short circuited and the flow rate related voltages are isolated from various drift signals during short signal sampling periods. Some versions of the invention use multiple sensing heads in a single sensor to increase the magnitude of the flow related signal.

44 Claims, 5 Drawing Sheets

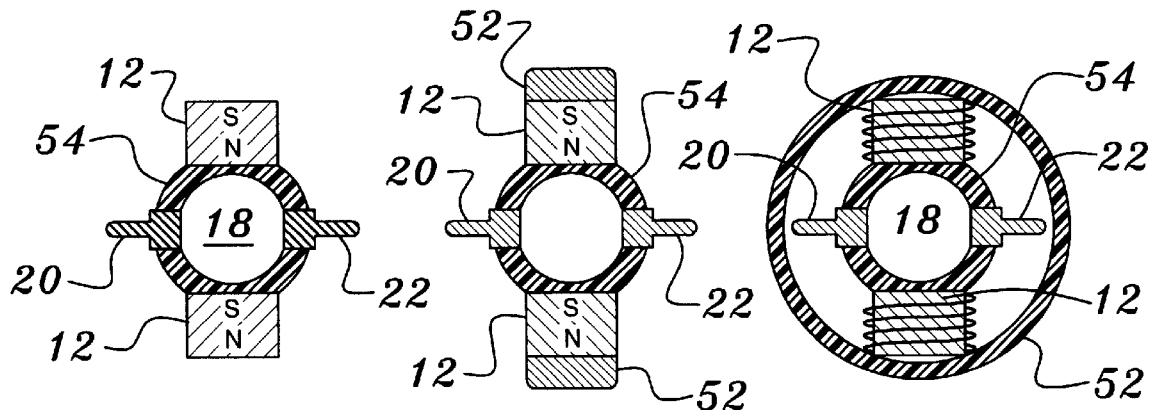
FIG. 6a  FIG. 6b  FIG. 6c
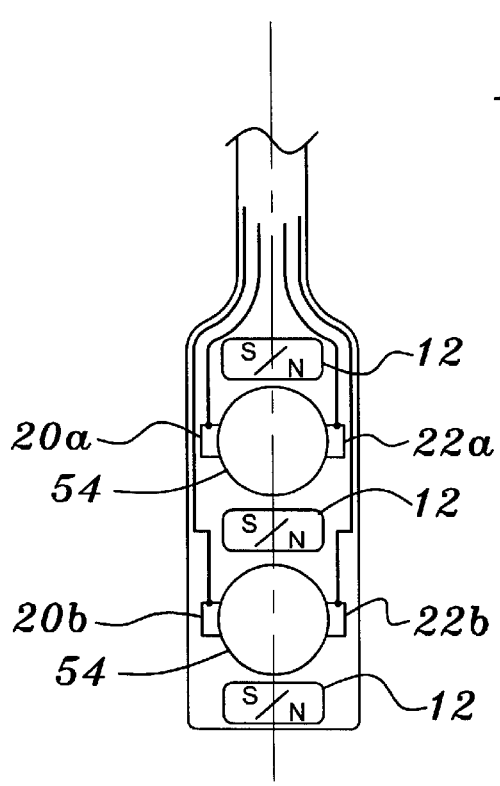
FIG. 7
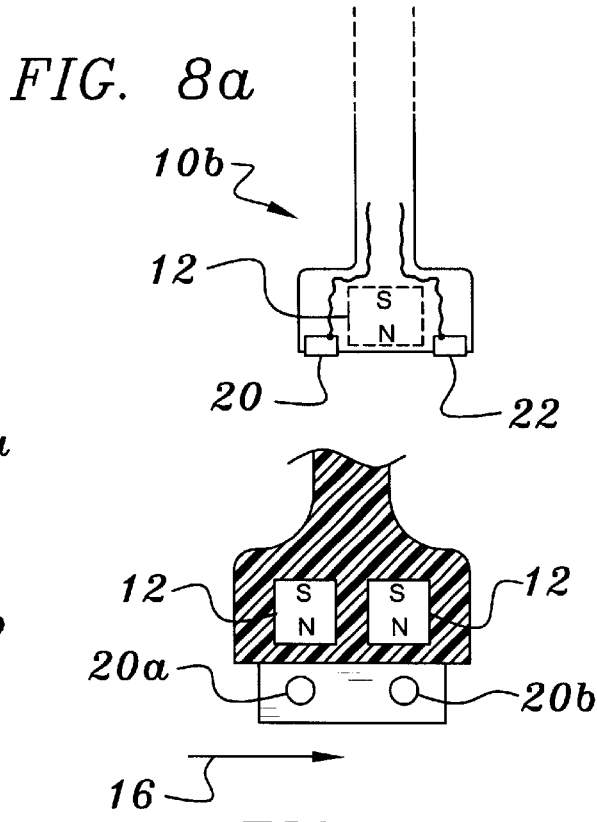
FIG. 8a
FIG. 8b

MAGNETIC FLOW SENSOR AND METHOD

CROSS REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Background Information

This invention relates to apparatus and method for determining the rate of flow of a fluid by measuring an electrical potential difference developed in the fluid as the fluid moves through a magnetic field. The potential difference is sensed by at least one pair of electrodes contacting the liquid and spaced apart from each other along a line that is generally orthogonal to both the direction in which the flow is being measured and a magnetic field produced by a magnet. The measured potential difference has a magnitude proportional to the flow rate of the fluid. As is known to those skilled in the art, the overall potential difference between two such electrodes, usually termed a voltage difference, has two major components: a) a flow-related voltage due to the flow of the fluid when acted upon by the magnetic field; and b) a net 'drift voltage', which is the sum of voltages due to all other factors, such as electrode polarization.

In prior art flow sensors of this type, alternating magnetic fields from electromagnets have generally been used to provide an alternating magnetic field. The alternating magnetic field facilitates signal amplification and processing that accepts flow-related electrode signals while rejecting electrode drift signals which would otherwise introduce serious measurement errors. However, generating those fields and processing the measured voltage signals requires sophisticated circuits and techniques which raise the cost of such sensors and limit their application.

An example of a radical departure from the prior art is found in my U.S. Pat. No. 6,085,599 in which I teach mechanical means to alternate the polarity of the magnetic fields. Those techniques provide practical ways of simplifying magnetic flow sensors and reducing their costs. However, the use of mechanical means to alternate the field polarity, even though this may be performed with a high degree of ruggedness and reliability, reduces the marketability of such an instrument. The disclosure of U.S. Pat. No. 6,085,599 is incorporated herein by reference.

Another problem encountered in prior art magnetic flow sensors is that of entrapment of ferromagnetic debris. This is particularly true of arrangements using permanent magnets as in my U.S. Pat. No. 6,085,599. Such debris can change the magnetic flux distribution and thereby alter the calibration of the flow meter. Moreover, pieces of ferromagnetic debris can sometimes bridge the normally electrically isolated electrodes, producing a conductive path that may partially short out the electrode signals and thereby reduce the output voltage. Fine particles of debris can also form a film on normally insulating portions of the structure surrounding the electrodes and thereby shunt the electrode signals.

It is therefore an object of the invention to provide a practical magnetic flow sensor using stationary permanent magnets.

It has also been discovered that the methods of the present invention can be used with conventional magnetic flow sensors using electromagnets to improve their performance and such is therefore a further objective of the invention.

BRIEF SUMMARY OF THE INVENTION

The above and other objects are attained by magnetic flow sensors in accordance with various preferred embodiments of the present invention. In preferred embodiments the magnetic axis i.e., the line extending from the south to the north pole) of a permanent magnet is oriented generally perpendicular to a direction of flow of a fluid. As is known in the magnetic flow metering art, the flux from a magnet arranged in this fashion generates, in the fluid, a voltage difference proportional to the flow rate of the fluid. This voltage difference is sensed by a pair of electrodes (which preferably have the same size and shape and are made of the same material) and which are spaced apart from each other along a line that is generally orthogonal to both a direction of flow and the magnetic axis. The electrodes are preferably short circuited to each other most of the time so that polarization and other DC factors responsible for DC electrode drift are minimized over a period of time. Periodically, the short circuit is opened for a brief time interval so that the flow-generated voltage difference then appearing at the electrodes may be detected and processed to provide an output signal representative of the flow rate of the fluid. During the open circuit portion of this duty cycle, drift inducing factors do begin to cause drift signals to develop. However, they develop relatively slowly compared to the brief time interval required to detect the flow rate signal and thereby enable electronic processing to discriminate between the two. This method of flow rate detection thereby enables an extremely simple magnetic flow sensor to be made.

Several sensing heads of the general configuration recited above—i.e., one or more permanent magnets with an adjacent pair of electrodes—may be used at different locations to sense the flow rate of a fluid. For example, two sensing heads can be spaced out along a section of pipe or tubing. The flow rate voltages from the plural heads can be polarized to be additive in the associated signal processing circuitry. DC drift voltages at the various electrodes would, however, have a random distribution of magnitudes of polarities and would thus average out to zero when the overall electrode voltages were summed. The magnitude of the flow related signal can thus be made relatively high compared to the error related drifts, thereby improving sensor performance. The present invention is well adapted to such configurations because of the low cost of the components that are used.

In addition to improving the ratio of flow-related signals to drift signals, a two-headed sensing configuration comprising an upstream head and a downstream head can be used to detect the presence of ferromagnetic debris, most of which is likely to be trapped by the permanent magnet portion of the upstream sensing head. This debris can alter the magnetic flux distribution and shunt the flow-related voltage of the upstream head, thereby reducing the value of its flow-related voltage. Thus, if one compares the flow-related signals from identical upstream and downstream sensing heads and finds that those signals differ by more than some predetermined threshold value, one can conclude that at least the upstream head is contaminated with ferromagnetic debris and that cleaning of the wetted portions of the sensor is required.

Although various numbers of sensing heads can be used in the invention, in preferred methods of operation all of the paired electrodes of all the sensing heads are shorted together during a relatively long portion of an operating duty cycle. During a relatively short portion of the duty cycle a switching device can be used to sequentially open circuit pairs of electrodes and connect each open circuited pair to a common measurement circuit in order to measure its flow-related open circuit voltage. A switching device can also open circuit pairs of the electrodes and connect them to separate inputs of a common measurement circuit to measure the flow related voltages. Those skilled in the signal processing arts will realize that with these and other arrangements for aggregating open circuit voltages one can obtain a simple average of the output voltages, an average of the sum of the individual output voltages, or various other selected statistical measures.

Generally speaking, the flow-generated component of the open circuit voltage will appear quickly (i.e., it can be measured after a predictable rise time that depends primarily on the resistivity and dielectric constant of the flowing fluid) after an electrode pair is switched from a shorted to an open circuit state. Electrode pair drift voltages, by contrast, depend on electrode polarization and other generally much more slowly acting effects and can thus generally be effectively excluded by making the open circuit voltage measurement quickly. Thus, one can readily determine a fluid-dependent operating duty cycle comprising a first period in which all electrode pairs are shorted together for a long enough interval for polarization and other drift effects to reach an acceptably stable condition; and a second readout period in which appropriate switching devices and voltage measurement circuitry are used to detect the open circuit voltages from all the electrode pairs used in the sensor. In a preferred embodiment the first period is substantially longer then the second. Other relationships between the lengths of the first and second periods may be workable, but these measurements may experience greater instabilities.

In some embodiments multiple permanent magnets are used with an internal streamlined body and a flow tube, both of which are electrically insulating and in contact with the fluid. Each such section has its own pair of electrodes. Both the magnetic flux, which is orthogonal to the fluid flow, and the fluid itself are thus concentrated to provide a relatively large flow-related signal.

In another preferred embodiment of the present invention, the flux from two permanent magnets reinforce each other across an orthogonally oriented passage through which a fluid flows. Various other preferred embodiments including probe configured flow sensors are included.

In some embodiments, the present invention is applied to conventional magnetic flow sensors which use a pulse of electrical energy through a coil of wire to produce a pulsed magnetic field. The pulsed magnetic field occurs coincident with the opening of the short circuit to the electrodes so that the flow generated voltage difference can be detected and processed to provide an output signal representative of the flow rate of the fluid. Operation is therefore essentially the same as when the permanent magnet is used.

Those skilled in the arts of magnetic flow sensing will appreciate that although relative motion between a liquid and a sensing head is essential in instruments of this sort, there is no requirement that the sensing head be stationary in an inertial frame of reference. One can equally well use the invention for measuring the rate of progress of a sensing head through a stationary fluid, as is done when measuring the speed of a ship having a sensing head mounted to or projecting outwardly from its hull.

Although it is believed that the foregoing recital of features and advantages may be of use to one who is skilled in the art and who wishes to learn how to practice the invention, it will be recognized that the foregoing recital is not intended to list all of the features and advantages. Moreover, it may be noted that various embodiments of the invention may provide various combinations of the hereinbefore recited features and advantages of the invention, and that less than all of the recited features and advantages may be provided by some embodiments.

BRIEF DESCRIPTION OF THE SEVERAL VIEWS OF THE DRAWING

FIG. 6a is a cross-sectional view of a sensing head similar to that of FIG. 5, but from which the bridging bar is omitted, the section taken as indicated by the double-headed arrow 6—6 in FIG. 5.

FIG. 6b is a cross-sectional view of the sensing head of FIG. 5, the section taken as indicated by the double-headed arrow 6—6 in FIG. 5.

FIG. 6c is a cross-sectional view of a sensing head similar to those of FIGS. 6a and 6b, except that the magnets are depicted as being electromagnets, and the bridging bars of FIG. 5 are replaced with a bridging tube surrounding the flow sensing head.

FIG. 7 is a schematic end view of a flow probe in which three permanent magnets supply magnetic flux to two flow channels.

FIG. 8a is a schematic side view of a sensing head configured as a flow probe.

FIG. 8b is a longitudinal section taken though a flow probe similar to that of FIG. 8a, but comprising two magnets and two pairs of electrodes.

DETAILED DESCRIPTION OF THE INVENTION

Figure 1:
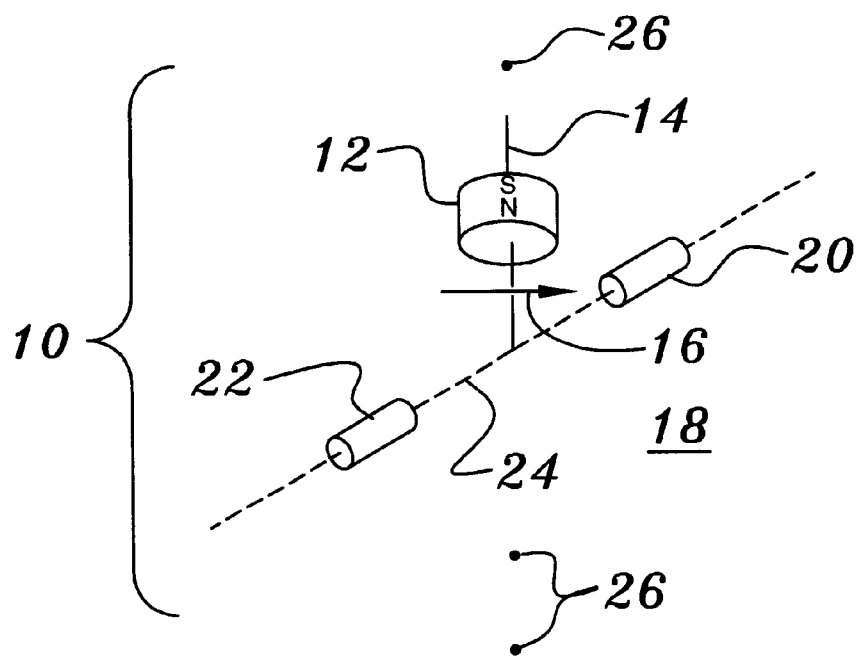
FIG. 1 is a schematic view of the sensing head portion, i.e., the signal generating components, of a flow sensor of the invention.

FIG. 1 schematically illustrates the basic signal generating components, or sensing head 10, used in a variety of flow sensors of the present invention. A magnet 12, which is preferably a permanent magnet, is aligned so that its magnetic axis 14 provides magnetic flux generally orthogonal to the direction of flow 16 of a flowing fluid 18. A pair of electrodes 20, 22 are spaced apart along a line 24 that is generally orthogonal to both the magnetic axis 14 and to the direction of flow 16. Those skilled in the art of magnetic flow meters, or Faraday flow meters, will understand that although an ideal measuring arrangement of this sort is discussed in terms of mutually orthogonal axes, deviations from perpendicularity may occur in practice and result in corresponding degradation of performance that is explicable by the well known cosine relationships. Hence, the term "orthogonal", as used hereinafter denotes generally orthogonal relationships as ideal, but encompasses deviations from that ideal arrangement.

A preferred sensing head 10 comprises at least one permanent magnet 12 and at least one pair of electrodes 20, 22 arranged as described above. As will be described in greater detail hereinafter, additional magnets 12 or electrode pairs 20, 22 may be used in some sensing heads 10. These additional components are schematically indicated in FIG. 1 by black dots 26.

Figure 2:
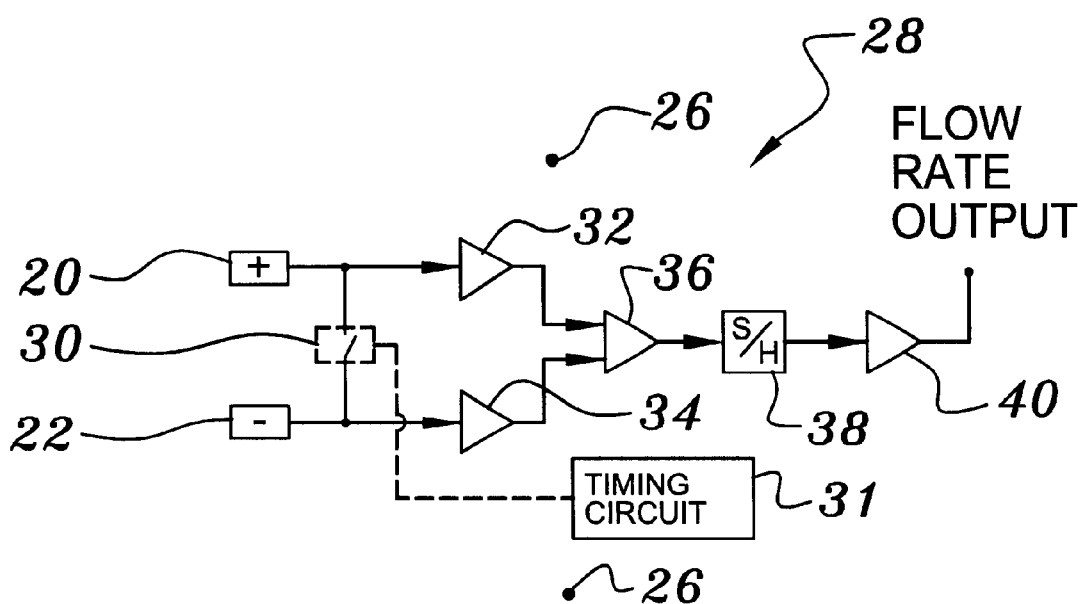
FIG. 2 is a schematic block diagram of an electronics circuit usable to control and process signals generated by sensing head of FIG. 1.

Turning now to FIG. 2, one finds a simplified block diagram of preferred electronic circuitry used with the preferred sensing head 10. A switching device 30, which is preferably a CMOS switch, but which may be an electromechanical relay or other suitable switching element, is arranged so that it either directly electrically connects the two electrodes 20, 22 of a pair of electrodes together, or it individually connects each of the electrodes 20, 22 to circuitry adapted to measure the open circuit voltage difference between the two electrodes. The switching device 30 operates under control of an appropriate timing circuit 31 to provide the previously discussed duty cycle comprising a relatively long period during which the electrodes 20, 22 are shorted together and a relative short interval during which the voltage measurement is made. The voltage measurement circuit 28 can comprise a plurality of amplifiers 32, 34, and 36 that can amplify and detect the difference voltage between the electrodes, and store the measured voltage in a sample and hold circuit 38 for final amplification by an output amplifier 40. Such an amplifier chain would typically incorporate high pass filtering to accept the short duration voltage pulse present during the measurement interval while the relay 30 is open, while not responding to any slow changing voltage typical of electrode drifts. The preferred amplifier chain incorporates capacitive coupling to the sample and hold 38 so that its own DC voltage drift will be eliminated from the stored signal. The output amplifier 40 would typically incorporate a low pass filter to attenuate noise and ripple resulting from the sampling operation of the sample and hold 38. The amplifier chain 32, 34, 36 is also ground referenced to the sensing components 10 so that they operate within their dynamic range. The ground is preferably a direct connection to the fluid and typically involves an electrode attached to the sensing head, a conductive portion of the sensing head mechanical assembly or connection to electrically conductive pipes or tubing through which the fluid may be flowing.

The sensing head 10 of FIG. 1 and basic switching and measurement circuitry of FIG. 2 can be viewed as building blocks for various embodiments of the present invention and may be used more than once, as indicated in both figures by the black dots 26. Because the relay 30 opens for only a very short interval compared to the drift rate normally associated with the electrodes 20, 22, the resultant drift voltage will be relatively small. Furthermore, the electrode signals have a consistent flow rate related magnitude and polarity which enables those signals to be summed to increase those magnitudes. However, if the electrodes are of the same substance, have similar surface areas, and are exposed to the same fluid environment, they will experience voltage drifts of a random nature that will tend to average out to zero.

In typical operation the contacts of the relay 30 are closed and short circuit the electrodes almost continuously. For example, they cyclically close for ninety nine milliseconds and open for only a one millisecond interval during which the signal processing occurs. With this method of operation, instability problems due to electrode polarization and other factors are sufficiently reduced so that a practical flow sensor can be realized without the need to alternate the polarity of the magnetic flux, thereby enabling a relatively simple and low cost flow sensor to be produced.

Figure 3:
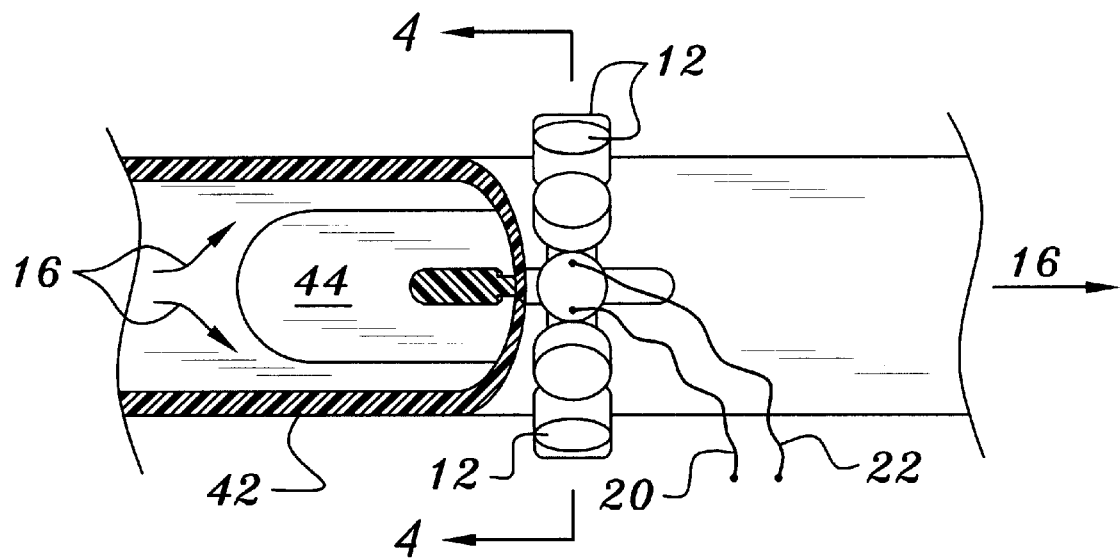
FIG. 3 is a partly cut away side elevational view of a preferred sensing head mounted in a pipe or tube.
Figure 4:
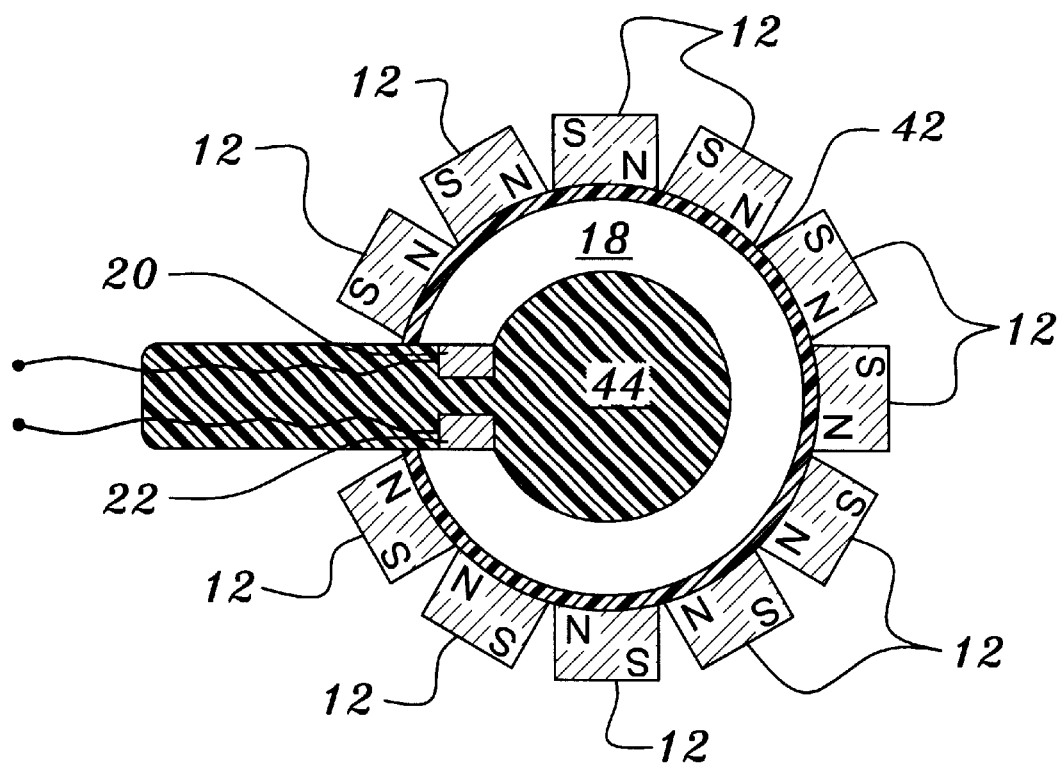
FIG. 4 is a cross sectional view of the sensing head of FIG. 3, the section taken as indicated with the double headed arrow 4—4 in FIG. 3.

FIGS. 3 and 4 depict one embodiment of a sensing head in accordance with the present invention. A tube 42 confines a flowing fluid that passes around a streamlined member 44 that is elongated in the direction of flow and retained in its position along the axis of the tube by a suitable support that projects through the wall of the tube and that supports the electrode pair. In a preferred depicted embodiment, the streamlined member 44 defines a fluid flow region that, except for the portion intercepted by the support, is annular. Sensing electrodes 20, 22 are preferably located on opposite sides of the support so as to define a nearly annular path over which the flow-related voltage is measured. Magnets 12 provide a generally uniform field of magnetic flux orthogonal to the annulus. This use of multiple permanent magnets having their magnetic axes aligned along radii of the tube, and a streamlined member 44 reduces the cross sectional area of the passages for the flowing fluid 18, increases the voltage generating distance between the electrodes to be nearly equal to an inner circumference of the tube 42, and increases the magnetic flux in those passages, thereby increasing the magnitude of the flow-generated signal.

In FIGS. 3 and 4, a plurality of permanent magnets 12 spaced apart along a circumference of the outside of a tube 42 are used to provide the magnetic field. A single magnet magnetized with a radial orientation of its flux could similarly be used. One or more magnets with other flux orientations which may use magnetic materials to direct and concentrate the flux are also usable. A moving coil loudspeaker, for example, uses a similar radially oriented flux to activate its voice coil. The magnets may additionally or entirely be located in the streamlined member 44. Moreover, the streamlined member 44 may be modified to be a flat plate to provide the equivalent isolation between the electrodes. The relative polarity of the magnetic fields may be changed as long as the flow generated voltages in the fluid do not short circuit each other, the electrodes are short circuited and the signals summed as prescribed.

FIGS. 5, 6a, 6b, and 6c depict variations of a preferred embodiment of the flow sensor which is well suited for small pipe sizes. Magnets 12 provide mutually aiding magnetic flux through the fluid which is contained by the electrically insulating housing 54. Electrodes 20, 22, sense the voltage signals generated in the fluid and route them to the supporting electronics. A separate ground electrode 50 provides a ground connection between the fluid and the supporting electronics, and a magnetic trap 48 removes magnetic debris from the inlet to the sensing head.

Figure 5:
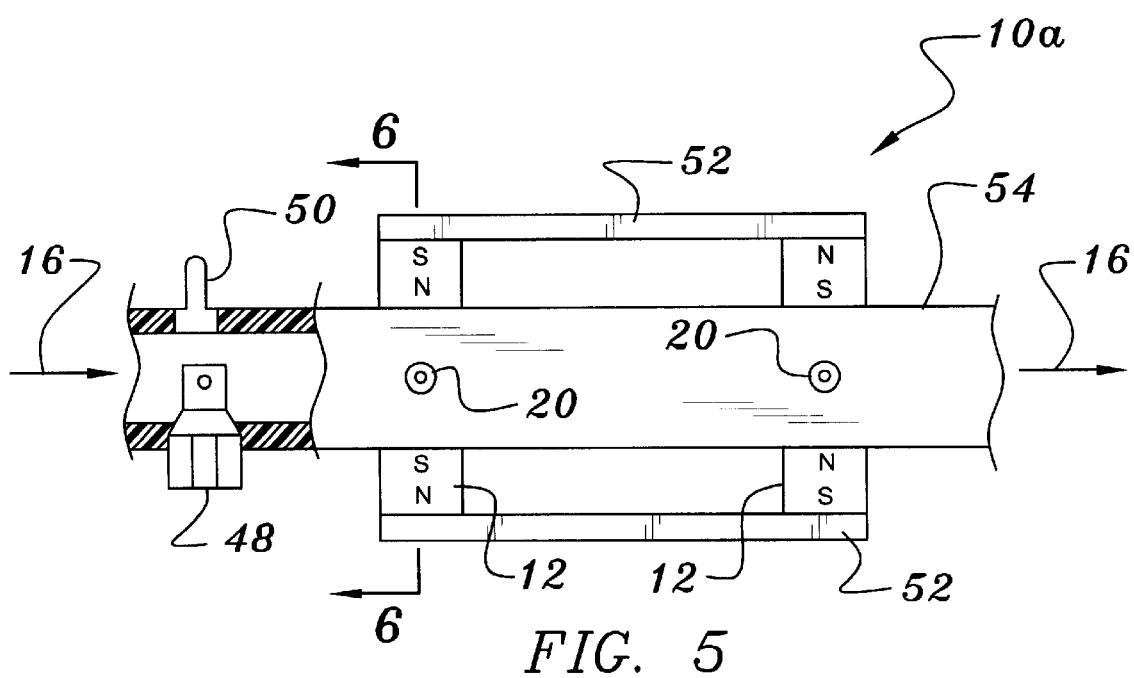
FIG. 5 is a partly cut-away schematic side elevational view of another in-line flow sensing head arrangement of the invention.

A representative flow sensor having a single sensing head and generally configured like that of FIGS. 5 and 6a was constructed using a body of ½ inch CPVC plastic tube upon which were mounted two Nd rare earth magnets. Each of the magnets was ½ inch in diameter, ½ inch in length, and had a maximum energy product rating of twenty seven Megagauss-Oersteds. The one ground and two sensing electrodes mounted in the body had wetted diameters of one eighth inch and were made of Type 316 stainless steel. This sensing head was used in conjunction with an electronic circuit made in accordance with the depiction of FIG. 2. A general purpose CMOS switch 30 was used to short the electrodes 20, 22 together. A CMOS differential amplifier having a high input impedance and enabling an overall voltage gain of one thousand to be achieved in the circuit was used to amplify the electrode voltages. A timing generator 31 supplied pulses with a duration of one millisecond to the CMOS switch at approximately ten times per second. The sample and hold circuit 38 was enabled two hundred microseconds after the CMOS switch opened to allow the amplified voltage to stabilize before sampling the signal. Sampling continued for the balance of the CMOS switch open time. An output from this circuit was approximately 0.5 volts for each one foot per second of flow rate when tap water was passed through the sensing head.

When physical dimensions are small, the permanent magnets used in the depiction of FIGS. 5, 6a and 6b are relatively inexpensive and can conveniently and economically be used to provide a medium to high intensity magnetic field throughout the entire passage used for flow sensing. When only two electrodes and two magnets are used in the depicted sensor, sufficient flow related signal relative to electrode drift signal is present to enable practical sensors to be made this way. The overall sensing region may be elongated so that multiple sensing heads can be located along its length, as discussed above with respect to signal addition and to the detection of ferromagnetic debris. If a sensing head 10a is configured with two sets of magnets which are alternated in polarity with pieces of ferromagnetic material 52 joining them from pole to pole on the outside of the flow passage, stray magnetic fields will be minimized and little of the field will escape outside the sensing head.

Other sensing heads can be mechanically configured in a parallel array to accommodate a greater flow volume. For example, the flow probe depicted in FIG. 7 provides two flow passages 54, two pairs of electrodes 20a, 22a, 20b, 22b and three magnets 12, one of which is shared between the two flow passages. An arrangement of this sort reduces the total number of magnets used. As an additional refinement, a magnetic material in the shape of a tube may surround the sensing head, at least in the vicinity of the magnets, in order to complete the magnetic path between the magnets outside of the flow passage.

Figure 8C:
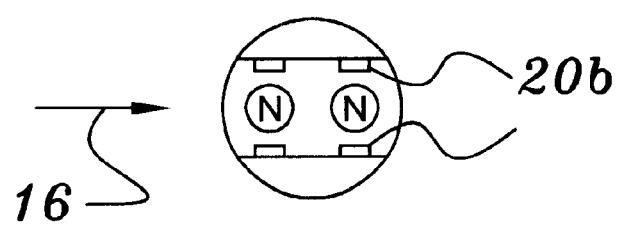
FIG. 8c is an end view of the flow probe of FIG. 8b.

FIG. 8a depicts a sensing head configured as a flow probe 10b in which a single magnet 12 provides the required magnetic flux. As in other sensing heads described above, a pair of electrodes 20, 22, sense the voltage signals in a fluid 18 flowing in a direction perpendicular to the plane depicted in FIG. 8a. FIGS. 8b and 8c depict a sensing head configured as a flow probe comprising two closely spaced magnets having the same polarity, where each of the magnets has a pair of electrodes adjacent it. The choice of the magnets' polarity in this probe is such as to minimize the risk of the magnets being bridged by ferromagnetic debris. When space permits, the magnets may be sufficiently removed from each other so that they can be oriented with opposite polarities without bridging. An advantage of opposite polarities is a shorter and more confined magnetic field outside of the region used for generating the flow rate responsive signal.

Figure 9:
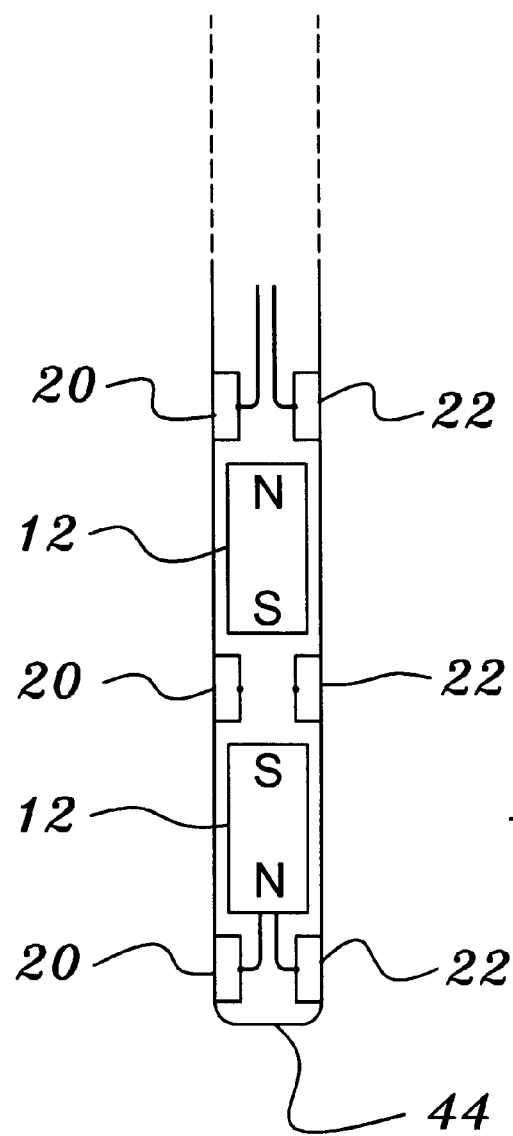
FIG. 9 is a schematic side view of a flow probe in which two permanent magnets are used with three pairs of electrodes.

Turning now to FIG. 9, one finds a depiction of another sensing head arranged as a flow probe to operate with fluid flowing perpendicular to the plane of the drawing. In this configuration the magnets 12 generate a magnetic flux orthogonal to the flowing fluid passing on either side of the support 44. By adding magnet and electrode pairs, the magnitude of the flow related signal may be further increased and averaging of the electrode signals further improved.

In all of the embodiments previously described a magnetic field needs to be present and penetrate the fluid during the interval when the short circuit across the sensing electrodes is opened so that the flow generated voltage difference can be detected and processed to provide an output signal representative of the flow rate of the fluid. The field need not be present at other times. Thus, although most of the foregoing discussion has addressed the use of permanent magnets, one could as well choose to use electromagnets in configuring the various exemplar sensing heads. Moreover, the magnetic field may be of the same polarity or reverse its polarity, in which case the processing electronics would additionally incorporate a rectifying function to provide the typical output signal. Such fields and electronic processing are commonly used with conventional magnetic flow meters. By using the features of the present invention to reduce electrode drift, these sensors become more stable and tolerant of their installation environment A particular deficiency of prior art permanent magnet flow meters is that by not reversing the magnetic field or at least cyclically diminishing it to zero, ferromagnetic debris in the fluid will be attracted to and accumulate on the sensor surfaces opposite the pole faces of the magnets 12. Such accumulations will affect the fluid flow through the sensor, distort its signal generating magnetic field and shunt the flow generated signal thereby degrading its precision of measurement in varying degrees depending on the extent of the accumulations. In applications where ferromagnetic debris is present in the fluid, the sensing head may have to be removed from service and cleaned periodically. In the depiction of FIGS. 3 and 5, for example, if the magnets 12 can be temporarily removed from the tube 42, the debris can be released and carried downstream. To facilitate this maintenance operation, the magnets may be mounted together in one or more removable assemblies indexed for easy re-installation.

Another approach to minimizing problems with ferromagnetic debris is to install a magnetic trap 48 on at least the upstream side of a sensing head. This trap 48 need only consist of a permanent magnet providing a magnetic flux which effectively acts as a filter to attract and retain ferromagnetic debris before it reaches the sensing head The trap 48 may be mounted in a pipe or tube in direct contact with the fluid and may be in the form of a plug which is removable for cleaning. The trap may further be inserted and removed when isolated though a valve without the need to stop normal fluid flow. Furthermore, a sensing head based upon the present invention may be configured as a probe that can be easily inserted and removed from its flow environment to facilitate frequent cleaning.

Because the mechanical, magnetic and electrical components of a preferred sensor are relatively simple and inexpensive, it is practical to have the same fluid flow through what is essentially a second sensing head even though they may be mechanically supported by the same housing. While the flow generated signals may be combined for the purposes of making a flow rate measurement, they may also be compared to determine whether they differ substantially. If they do so differ, it would likely be an indication of accumulation of magnetic debris. It is noted that the flow responsive components on the inlet, upstream, side of the sensor would then have functioned as a magnetic trap and attracted virtually all of the debris, while those on the downstream end would be clean. When the corresponding difference in output signals is great enough, it can be used to activate an alarm calling for sensor servicing. Furthermore, when an upstream sensing head provides a flow rate signal determined to be substantially in error because of debris, that signal may be automatically omitted so that only the output signal produced by the downstream flow responsive components, with a correct scaling factor, is used to provide the output signal until the sensor is serviced. The difference detection and compensation arrangement expressed above is also useful for detecting any defect in operation in general and thereby for improving the overall reliability of the sensor.

Because the mechanical, magnetic and electrical components of a preferred sensor are relatively simple and inexpensive, it is practical to have the same fluid flow through what is essentially a second sensing head even though they may be mechanically supported by the same housing. While the flow generated signals may be combined for the purposes of making a flow rate measurement, they may also be compared to determine whether they differ substantially. If they do so differ, it would likely be an indication of accumulation of magnetic debris. It is noted that the flow responsive components on the inlet, upstream, side of the sensor would then have functioned as a magnetic trap and attracted virtually all of the debris, while those on the downstream end would be clean. When the corresponding difference in output signals is great enough, it can be used to activate an alarm calling for sensor servicing. Furthermore, when an upstream sensing head provides a flow rate signal determined to be substantially in error because of debris, that signal may be automatically omitted so that only the output signal produced by the downstream flow responsive components, Accumulations of magnetic debris are particularly troublesome when they are electrically conductive because they can then substantially short circuit the flow generated signal. However, the short circuit can be detected by periodic measurement of the electrical resistance between the electrodes. If the resistance is below a predetermined alarm threshold, an alarm function can then be initiated to advise service personnel of the need to clean the sensing head. The resistance measurement is preferably made by occasionally switching a voltage difference of 0.1 volts, for example, across an electrode pair during a period when the switching device 30 is connecting the electrodes to the measurement circuit and the sample and hold is disabled. The electrical resistance is equal to the value of a series resistor multiplied by the ratio of the difference voltage between the electrodes and the resistor. This technique may further be used to compare resistance values between different sets of flow sensing components when making the comparisons recited above in deciding whether to activate an alarm or to eliminate invalid signals.

Another alternate or additional approach to protecting a sensing head from ferromagnetic debris is to periodically remove the sensor's magnetic field by physically removing the permanent magnets or turning off electromagnets. This will release the debris which can then be removed by fluid flow or captured by a trap. The sensing heads depicted in FIGS. 5, 6a and 6b are examples of configurations compatible with removal of the permanent magnets, which can slide horizontally out of position and then be replaced. Ideally, the magnets would be configured as one or more modules to facilitate such removal and replacement.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A flow sensor for measuring a flow rate at which a fluid flows relative to a sensing head in a flow direction, the sensor comprising:
    at least one stationary permanent magnet arranged to have its magnetic axis generally orthogonal to the flow direction;
    at least one pair of electrodes adapted to be wetted by the flowing fluid, the electrodes of the at least pair thereof spaced apart from one another along a line generally orthogonal to both the flow direction and to the magnetic axis;
    at least one switching device having two states, the switching device, when in the first state, directly electrically connecting one of the at least one pair of electrodes to the other of the at least one pair of electrodes, the switching device, when in the second state, connecting a voltage measurement circuit between the one of the at least one pair of electrodes and the other of the at least one pair of electrodes;
    wherein the voltage measurement circuit is adapted to measure the voltage between the electrodes of the at least one pair thereof and to provide an output representative of the flow rate.

2. The flow sensor of claim 1 further comprising a timing generator adapted to control the switching device to repeatedly switch between the first and the second states so that the switching device is in the first state most of the time.

3. The flow sensor of claim 1 wherein the switching device comprises a CMOS switch.

4. The flow sensor of claim 1 wherein a single permanent magnet and a single pair of electrodes are disposed on a supporting structure adapted to be inserted as a probe into the fluid.

5. The flow sensor of claim 1 wherein the at least one pair of electrodes comprises at least two pairs of electrodes, each of the pairs of electrodes operatively associated with a respective switching device, and wherein the voltage measurement circuit is adapted to aggregate the voltage measured between a first pair of electrodes with the voltage measured between a second pair of electrodes and to provide that aggregated voltage measurement as the output.

6. The flow sensor of claim 1 wherein the at least one pair of electrodes comprises at least two pairs of electrodes, each of the pairs of electrodes operatively associated with a respective switching device, and wherein the voltage measurement circuit is adapted to measure a difference between the voltage measured between a first pair of electrodes and the voltage measured between one of the other pairs of electrodes and to provide an output if that difference exceeds a predetermined threshold value.

7. The flow sensor of claim 1 wherein the at least one pair of electrodes comprises three electrodes, one of which is used in common so as to provide two pairs of electrodes, the sensor further having a respective switching device operatively associated with each of the pairs of electrodes, and wherein the voltage measurement circuit is adapted to aggregate the voltage measured between the first pair of electrodes with the voltage measured between the second pair of electrodes and to produce the output from that aggregate.

8. The flow sensor of claim 1 wherein the at least one pair of electrodes comprises two pairs of electrodes spaced apart on opposite sides of the permanent magnet.

9. The flow sensor of claim 1 comprising a single measurement circuit and two or more pairs of electrodes and wherein the switching device is adapted to sequentially connect each of the pairs of electrodes to the single measurement circuit.

10. The flow sensor of claim 1 comprising a single measurement circuit and two or more pairs of electrodes and wherein the switching device is adapted to simultaneously connect all of the pairs of electrodes to the single measurement circuit when in the second state.

11. The flow sensor of claim 1 wherein the measurement circuit is adapted to measure an electrical resistance between any two electrodes and to provide an output if that resistance is less than a predetermined value.

12. The flow sensor of claim 1 wherein the permanent magnet is mounted on a removable assembly.

13. The flow sensor of claim 1 comprising two or more pairs of electrodes wherein the measurement circuit comprises comparison means adapted to compare the voltages measured between respective pairs of electrodes and to omit one or more of those voltages from the output representative of the flow rate.

14. A method of operating a magnetic flow sensor in which a fluid flows in a flow direction orthogonal to a magnetic field, the flow sensor comprising at least one pair of wetted electrodes spaced apart from each other along a line mutually orthogonal to both the flow direction and to the magnetic field, the flow sensor further comprising at least one voltage measurement circuit for measuring an electric voltage between the at least one pair of electrodes, the electric voltage proportional to the flow rate, the method comprising the steps of:
   a) operating at least one electric switching device to directly electrically connect the at least one pair of electrodes to each other for a first selected interval;
   b) operating the at least one electric switching device to disconnect the at least one pair of electrodes from each other and to connect the at least one pair of electrodes to the voltage measurement circuit for a second selected interval; and
   c) measuring the electric voltage during the second selected interval.

15. The method of claim 14 wherein the flow sensor comprises two spaced apart pairs of electrodes and a single electric switching device so that the electric voltage measured in step c) is an aggregate electric voltage.

16. The method of claim 14 wherein the flow sensor comprises two or more spaced apart pairs of electrodes, each of the spaced apart pairs of electrodes having a respective switching device associated therewith, each of the switching devices connecting the respective pair of electrodes to a respective voltage measuring circuit during step b), wherein step c) comprises measuring a separate electric voltage for each of the two or more pairs of electrodes, the method further comprising an additional step d) of aggregating the all of the electric voltages measured in step c).

17. The method of claim 14 wherein the flow sensor comprises two spaced apart pairs of electrodes, each of the spaced apart pairs of electrodes having a respective switching device associated therewith, each of the switching devices connecting the respective pair of electrodes to a respective voltage measuring circuit during step b), wherein step c) comprises measuring a separate electric voltage for each of the two pairs of electrodes, the method further comprising an additional step d) of comparing the two voltages measured in step c) and providing an alarm output if the two voltages differ by more than a predetermined amount.

18. The method of claim 14 wherein the flow sensor comprises a resistance measuring circuit and wherein step b) further comprises providing an alarm output if a resistance measured is less than a predetermined threshold value.

19. The method of claim 14 wherein the second interval is shorter than the first interval.

20. Apparatus for measuring the flow rate of a fluid in a tube, the apparatus comprising:
   at least one stationary permanent magnet adapted to provide a radial flux within the tube;
   a streamlined body extending along the axis of the tube and retained by a support extending through a wall of the tube, the streamlined body defining a nearly annular region in which the fluid may flow,
   a pair of electrodes attached to opposite sides of the support so as to define a voltage generating path therebetween, the voltage generating path extending through the nearly annular region; and
   a switching device having two states, the switching device, when in the first state, directly electrically connecting one of the pair of electrodes to the other of the pair of electrodes, the switching device, when in the second state, connecting a voltage measurement circuit between the one of the pair of electrodes and the other of the pair of electrodes.

21. The apparatus of claim 20 wherein the at least one magnet is attached to the outside of the tube by means of at least one removable assembly.

22. The apparatus of claim 20 wherein the support and the streamlined body are formed from a single piece of material.

23. The apparatus of claim 20, further comprising
   a second at least one permanent magnet adapted to provide a radial flux, the second at least one magnet spaced out along the axis of the tube from the first at least one magnet by a selected amount;
   a second pair of electrodes attached to opposite sides of the support and spaced out from the first pair of electrodes by the selected amount;
   means for separately measuring a respective voltage associated with each of the pairs of electrodes; and
   means for comparing the separately measured voltages and for providing an output if two of the separately measured voltages differ by more than a predetermined amount.

24. The apparatus of claim 20 comprising a plurality of permanent magnets disposed on an outside of the wall of the tube, each of the magnets having a respective magnetic axis aligned along a radius of the tube.

25. The apparatus of claim 20 comprising a first plurality of permanent magnets disposed on an outside of the wall of the tube along a circumference thereof, the apparatus further comprising:
   a second plurality of permanent magnets disposed on the outside of the wall of the tube, the second plurality of magnets spaced out from the first plurality of magnets along the axis of the tube by a selected amount;
   a second pair of electrodes attached to opposite sides of the support and spaced out from the first pair of electrodes by the selected amount;
   means for separately measuring a respective voltage associated with each of the pairs of electrodes; and
   means for comparing the separately measured voltages and for providing an output if two of the separately measured voltages differ by more than a predetermined amount.

26. Apparatus for measuring a flow rate of a fluid in a tube, the apparatus comprising:

at least two magnets spaced apart along the tube, each of the at least two magnets adapted to provide a respective radial magnetic flux having a selected polarity within the tube;

at least two pairs of electrodes adapted to be wetted by the fluid, each of the at least two pairs of electrodes adjacent a respective one of the at least two magnets, each electrode spaced apart from that other electrode with which it is paired along a line generally orthogonal to the tube;

at least one voltage measurement circuit adapted to measure a voltage difference between any of the pairs of electrodes when that pair of electrodes is electrically connected to the measurement circuit; and at least one switching device having two states, each switching device directly electrically connecting the two electrodes of the at least one pair thereof together when in the first state, the switching device connecting those two electrodes to the voltage measurement circuit when in the second state.

27. The apparatus of claim 26 further comprising a piece of ferromagnetic material extending along the tube from a first of the at least two magnets to a second of the at least two magnets.

28. The apparatus of claim 26 wherein the at least two magnets comprise at least two pairs of magnets, each of the at least two pars of magnets adjacent a respective pair of the at least two pairs of electrodes.

29. The apparatus of claim 26 wherein the at least two magnets are arranged to provide mutually aiding magnetic flux.

30. The apparatus of claim 26 wherein each of the at least two magnets is a permanent magnet.

31. The apparatus of claim 26 wherein each of the at least two magnets is attached to an outside of the tube by means of at least one removable assembly.

32. The apparatus of claim 26 further comprising a timing generator adapted to control the switching device to repeatedly switch between the first and the second states so that the switching device is in the first state most of the time.

33. The apparatus of claim 26 wherein each of the pairs of electrodes is operatively associated with a respective switching device, and wherein the voltage measurement circuit is adapted to aggregate the voltage measured between a first pair of electrodes with the voltage measured between a second pair of electrodes and to provide that aggregated voltage measurement as an output.

34. The apparatus of claim 26 wherein each of the at least two pairs of electrodes is operatively associated with a respective switching device, and wherein the voltage measurement circuit is adapted to determine a difference between the voltage measured between a first of the pairs of electrodes and the voltage measured between one of the other pairs of electrodes and to provide an output if that difference exceeds a predetermined threshold value.

35. The apparatus of claim 26 comprising a single measurement circuit, and wherein the at least one switching device is adapted to sequentially connect each pair of the at least two pairs of electrodes to the single measurement circuit.

36. The apparatus of claim 26 comprising a single measurement circuit, and wherein the at least one switching device is adapted to simultaneously connect all of the pairs of electrodes to the single measurement circuit when in the second state.

37. The apparatus of claim 26 wherein the measurement circuit comprises comparison means adapted to compare the voltages measured between respective pairs of the at least two pairs of electrodes and to omit one or more of those voltages from an output representative of the flow rate.

38. Apparatus for measuring a flow rate of a flowing fluid, the apparatus comprising:

at least one permanent magnet fixedly attached adjacent an end of a flow probe for insertion at a selected orientation into the flowing fluid, the permanent magnet having a magnetic axis generally orthogonal to a direction of flow of the flowing fluid when the probe is in the selected orientation;

at least one pair of electrodes adjacent the at least one permanent magnet, the two electrodes of the at least one pair thereof spaced apart from each other along a line generally orthogonal to both the flow direction and to the magnetic axis when the probe is in the selected orientation;

at least one voltage measurement circuit for measuring a voltage difference between any of the pairs of electrodes when that pair of electrodes is electrically connected to the measurement circuit; and at least one switching device having two states, the switching device directly electrically connecting the two electrodes of the at least one pair thereof together when in the first state, the switching device connecting those two electrodes to the voltage measurement circuit when in the second state.

39. The apparatus of claim 38 wherein the at least one permanent magnet comprises two permanent magnets spaced apart from each other along the direction of flow when the probe is in the selected position, and wherein a respective pair of electrodes is adjacent each of the two permanent magnets.

40. The apparatus of claim 39 wherein the voltage measurement circuit is adapted to separately measure a first voltage difference between the two electrodes adjacent the first of the two permanent magnets and a second voltage difference between the two electrodes adjacent the second of the two permanent magnets, the apparatus further comprising means to provide an output if a difference between those two voltage differences exceeds a predetermined threshold value.

41. The apparatus of claim 39 wherein the two magnets are arranged to provide mutually aiding magnetic flux.

42. Apparatus for measuring a flow rate of a fluid flowing in a flow direction, the apparatus comprising:

a flow probe for insertion at a selected orientation into the flowing fluid;

two or more permanent magnets fixedly attached to the probe and spaced out along the flow direction when the probe is in the selected orientation, each permanent magnet having a respective magnetic axis generally orthogonal to the flow direction when the probe is in the selected orientation;

two or more pairs of electrodes, each pair of the electrodes adjacent at least one of the permanent magnets, the two electrodes of each pair thereof spaced apart from each other along a line generally orthogonal to both the flow direction and to the magnetic axes when the probe is in the selected orientation;

at least one voltage measurement circuit adapted to measure a voltage difference between any of the pairs of electrodes when that pair of electrodes is electrically connected to the measurement circuit; and at least one switching device having two states, each switching device directly electrically connecting the two electrodes of at least one of a pair thereof together when in the first state, the switching device connecting the two electrodes to the voltage measurement circuit when in the second state.

43. The apparatus of claim 42 wherein the flow probe comprises two flow passages;

the two or more magnets comprise three magnets arranged so that one of the flow passages is disposed between the first and second magnets and so that the second flow passage is disposed between the second and third magnets; and wherein the two or more pairs of electrodes comprise exactly two pairs of electrodes, each of the two pairs of electrodes disposed adjacent a respective one of the flow passages.

44. The apparatus of claim 42 wherein the two or more magnets comprise exactly two magnets and the two or more pairs of electrodes comprise exactly three pairs of electrodes, the magnets arranged so that the first of the two magnets is disposed between a first of the three pairs of electrodes and a second of the three pairs of electrodes and so that the second of the two magnets is disposed between the second of the three pairs of electrodes and the third of the three pairs of electrodes.

* * * * *